United States Patent [19]
Biermann

[11] 3,926,012
[45] Dec. 16, 1975

[54] CONSTANT VELOCITY UNIVERSAL JOINTS

[76] Inventor: Arnold E. Biermann, Redart, Va. 23142

[22] Filed: July 10, 1973

[21] Appl. No.: 377,939

[52] U.S. Cl. ............................ 64/19; 64/12; 64/17; 64/21
[51] Int. Cl.² .......................................... F16D 3/54
[58] Field of Search ............... 64/19, 20, 21, 12, 17, 64/18, 6

[56] References Cited
UNITED STATES PATENTS

| | | | |
|---|---|---|---|
| 2,721,458 | 10/1955 | Bouchard | 64/21 |
| 2,809,505 | 10/1957 | Bouchard | 64/17 R |
| 3,075,368 | 1/1963 | Hulse | 64/19 |
| 3,396,553 | 8/1968 | Potter | 64/19 |
| 3,650,124 | 3/1972 | Chapman | 64/19 |

*Primary Examiner*—Samuel Scott
*Assistant Examiner*—Randall Heald

[57] ABSTRACT

A constant velocity university joint of the type which can be displaced both radially and axially from the shaft intersection. The joint requires no supporting means at the shaft intersection and permits radial movement of parallel shafts. The link elements of the joint are provided with resilent connections to compensate for slight deviations in angular velocity and to smooth out shock loads.

8 Claims, 8 Drawing Figures

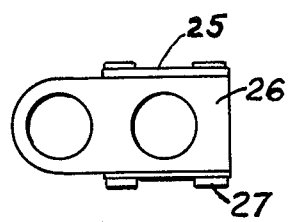
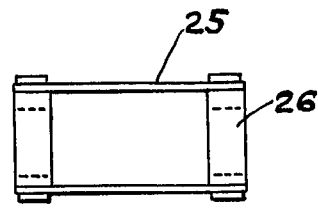
FIG. 4.    FIG. 5.
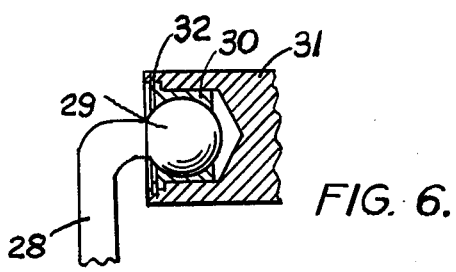
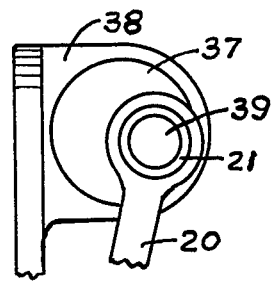
FIG. 6.    FIG. 8.
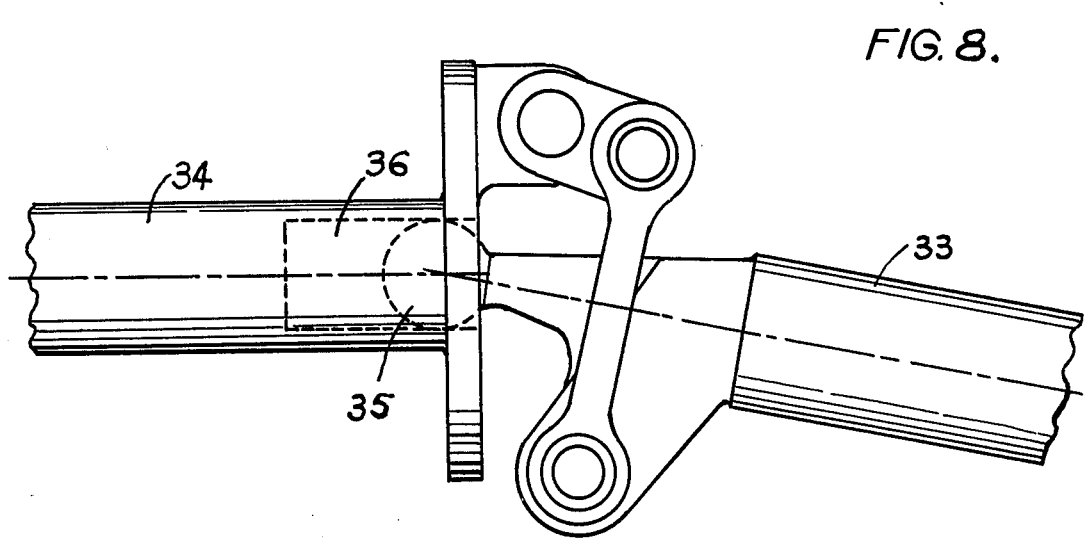
FIG. 7.

CONSTANT VELOCITY UNIVERSAL JOINTS

This invention relates to shaft couplings or universal joints which are used for joining rotating shafts or rotating elements. The general object is to provide a universal joint which provides substantially uniform or constant angular velocity of the one shaft with respect to the other shaft when one shaft is mis-aligned with respect to the other shaft.

One requirement of conventional constant-velocity universal joints is that they be placed at the intersection of the shaft axes. (In this specification the term 'shaft intersection' will denote the intersection of the shaft axes when one shaft is angularly displaced from the other shaft). Because of space limitations, this construction is not always possible. One object of this invention is to provide a constant-velocity universal joint which can be displaced both radially and axially from the shaft intersection.

A further object of this invention is to provide a constant-velocity joint which permits radial movement of parallel shafts.

Another object is to provide a universal joint which requires no supporting means at the shaft intersection.

A further object is to provide resilient means in the coupling to compensate for slight deviations in angular velocity and to smooth out shock loads.

My invention is capable of embodiment in many forms, but by way of illustration I have shown only the forms shown in the accompanying drawings, in which, FIG. 1 is a side view of my universal joint, as mounted on a supporting frame.

FIG. 4 is an end view of another form of the averaging-lever of FIG. 1.

FIG. 5 is a side view of FIG. 4.

FIG. 6 is a partial section view of another form of the connecting link and pivot bearing of FIG. 1.

FIG. 7 is a side view of another form of my invention.

FIG. 8 shows another construction of the averaging-lever of FIG. 7.

Figure 1:
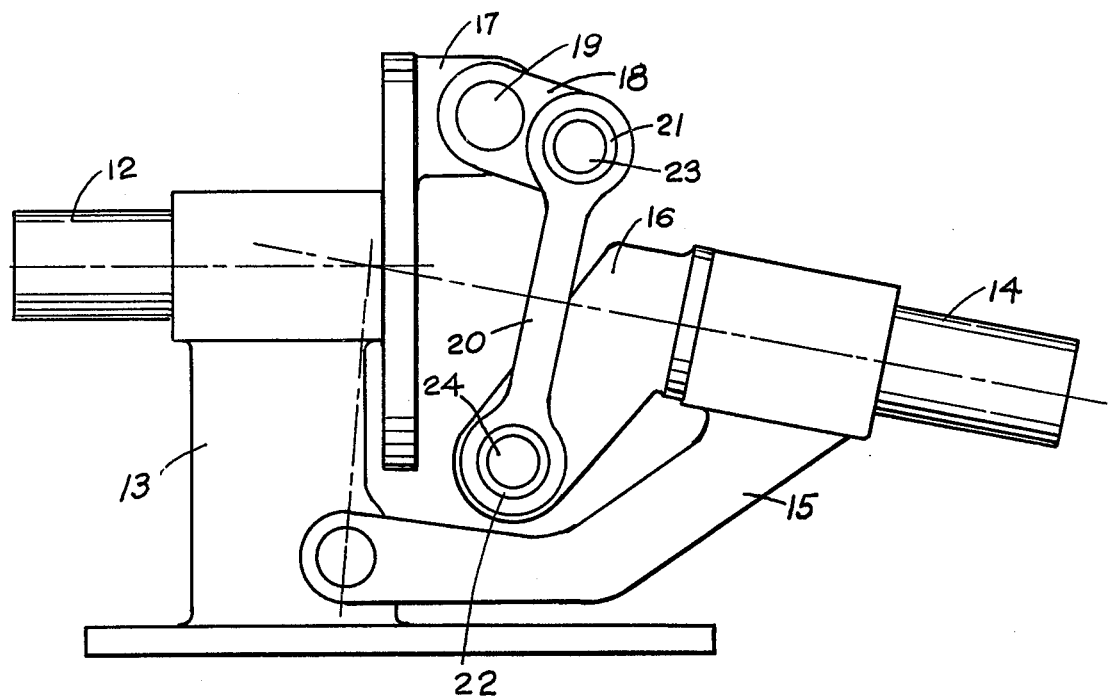
Figure 3:
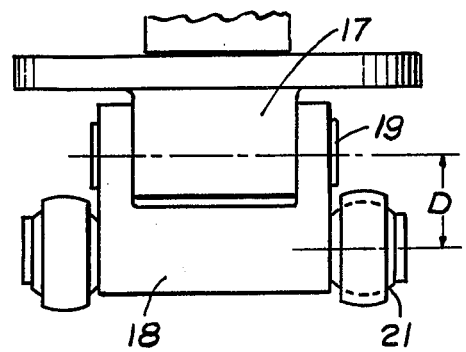
FIG. 3 is a top view of FIG. 2.
Figure 2:
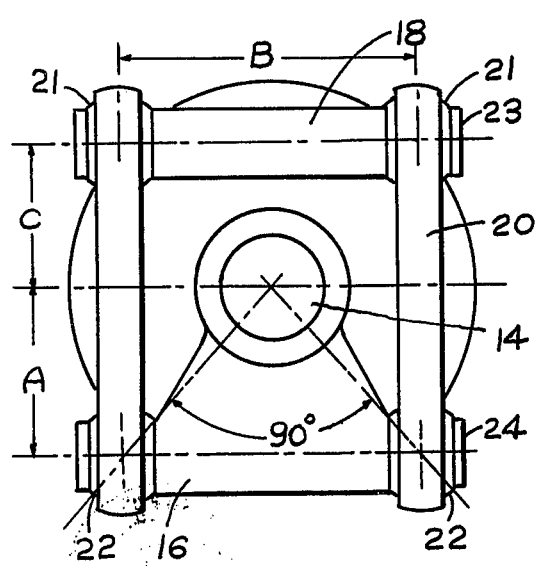
FIG. 2 is an end view of the universal joint.

Referring now to FIGS. 1, 2 and 3, the first shaft 12 is journaled in frame 13. The second shaft 14 is journaled in carriage 15. Link support arm 16 is supported on shaft 14. The averaging-lever support arm 17 is carried on shaft 12. Averaging-lever 18 is pivoted on shaft 19, which is journaled in support arm 17. Connecting links 20 are pivotably connected to averaging-lever 18 by universal joints 21 and are connected to link support arm 16 by universal joints 22. Universal joints 21 are supported on averaging-lever 18 by pivot shaft 23 and universal joints 22 are supported on link support 16 by pivot shaft 24.

FIGS. 4 and 5 show an alternate form of the averaging-lever 18 of FIG. 1, in which springs 25 are fastened to end plates 26 by means of rivets 27.

FIG. 6 illustrates another form of the universal joints which are provided at the ends of the connecting links. The connecting link 28 is provided on each end with ball 29. This ball is journaled in split bushing 30 which is retained in averaging-lever 31 by means of the retaining ring 32.

FIG. 7 illustrates another form of the invention in which the second shaft 33 is guided in the first shaft 34 at the shaft intersection by ball 35 in hole 36. The remaining parts are similar to those of FIG. 1.

An alternate form of the averaging-lever of FIG. 1 is shown in FIG. 8 in which the averaging-lever 37 is an eccentric shaft which is journaled in averaging-lever support arm 38. The connecting links 20 and the universal joints 21 are similar to those of FIG. 1. The universal joints 21 are mounted on averaging-lever 37 on pivot shaft 39.

In operation, turning shaft 12 of FIG. 1 induces a tension force in connecting link 20 on one side and a compression force in the connecting link on the other side. These forces constitute a force couple which causes rotation of shaft 14. It should be observed that the torque transmitted by this force couple is effectively applied on a diameter. Thus, the torque is not transmitted by an unbalanced tangential force. Consequently, this universal joint does not cause unbalanced side forces on the shaft bearings.

The general object of this invention is to provide substantially uniform velocity of the one shaft with respect to the other shaft under these conditions:

1. At different shaft angles.
2. When the shafts are parallel and displaced radially and axially, one with respect to the other.
3. When the position of the shaft intersection is varied with respect to the position of the universal joint.
4. Any combination of the foregoing.

My invention provides substantially uniform angular velocity of the one rotating member with respect to the other rotating member because of the following principles of operation:

Assume that a disc is mounted normal to a first shaft and a second disc is mounted normal to a second shaft and that the second shaft is positioned at an angle with respect to the first shaft. If point A on the first disc is aligned with point B (at the same radius) on the second disc and if both discs are rotated with equal angular velocities, the angular position of point B, when projected on the first disc will advance and retard twice each revolution with respect to point A. Thus, the angular movement of point B with respect to point A will simulate a sine wave in which the position of a positive angular deflection will be 90 degrees from the position of a negative angular deflection.

In my invention, I average the positive angular deflection and the negative angular deflection by mounting an averaging lever on the first rotatable member and by connecting the two ends of this lever to positions 90° apart on the second rotatable member. In this manner, the differences in angular velocities of the two members, or shafts, are substantially averaged out. In this specification this cross-lever is described as an 'averaging-lever.'

Furthermore, when the two shafts are parallel, but displaced radially or axially, the angular position of the first shaft with respect to that of the second shaft is not affected because the connecting links are parallel and describe a parallelogram.

From the foregoing, one basic requirement in the subject mechanism is that the distance between universal joints 21 (FIG. 2) of the averaging-lever 18 be the same as that between joints 22. A second requirement is that links 20 be attached to the second shaft on points on radii which are 90° apart. This latter requirement is also satisfied when $B = 2A$. Satisfactory results are obtained when $C = 0.9\ A$ and when $D = 0.5\ A$.

Operating models of my universal joint demonstrate that substantially uniform angular velocity is obtained over a wide range of the variables involved. These models show that the location of the shaft intersection can be an independent variable. Consequently, my universal joint does not have to be located at the shaft intersection or at a fixed relatioship to the intersection, as is required in many conventional universal joints.

FIG. 1 illustrates an example in which the shaft intersection moves axially as the shaft angle is varied. In this example a conventional universal joint would have to slide along each shaft, as the shaft angle is varied. This movement is required because the shaft intersection moves along each shaft. Mechanically, this is difficult to accomplish and is not required in my invention.

Small irregularities in the angular velocity of one shaft with respect to the other can be eliminated by using an elastic drive means 25 in the averaging-lever, as shown in FIGS. 4 and 5. This elastic means also serves to smooth out shock forces which may enter the system. Shaft 19 of FIG. 1 can also be employed as a torsion spring or torsion bar.

In FIG. 8 the cross-lever, or averaging-lever is embodied in the eccentric shaft 37. This shaft can be journaled in needle bearings, if desired. This design is of value in compact units where the pivot shafts must be close together.

While I have described my invention in detail, I wish it to be understood that many changes may be made therein without departing from the spirit of the same.

Having thus described my invention, I claim:

1. In a universal joint for connecting a first rotatable member to a second rotatable member, an averaging-lever pivoted on said first rotatable member and connecting links connecting said averaging-lever and said second rotatable member, said connecting links being connected to said averaging-lever and said second rotatable member with universal joint means.

2. A device as claimed in claim 1 in which said averaging-lever is provided with torsional flexure means whereby torsional flexibility is provided in said averaging lever.

3. A device as described in claim 1 in which said averaging-lever is an eccentric shaft mounted for rotation on said first rotatable member.

4. A device as described in claim 1 wherein said first rotatable member and said second rotatable member are mutually supported with ball joint means at the intersection of the axes of rotation of said members so that said shaft intersection can move axially with respect to said rotatable members.

5. Structure as set forth in claim 1 wherein said points of attachment of said connecting links on said second rotatable member lie in a plane normal to the axis of rotation.

6. Structure as set forth in claim 5 wherein said points of attachment of said connecting links on said second rotatable member lie on a line which is located from the axis of rotation a distance equal to half the distance between the two points of attachment.

7. Structure as set forth in claim 1 wherein the ratio of the length of each of said links to the length of the lever arm of said averaging-lever at the point of attachment of said link to said lever arm is similar for all links.

8. Structure as set forth in claim 1 wherein said universal joint means provides angular movement of said averaging lever with respect to said second rotatable member about the axis of said connecting link.

* * * * *